US005735980A

United States Patent [19]
Robeson

[11] Patent Number: 5,735,980
[45] Date of Patent: Apr. 7, 1998

[54] TRACTION DEVICE FOR A WHEELED VEHICLE

[76] Inventor: Palmer Edward Robeson, 1832 Birch Rd., McLean, Va. 22101

[21] Appl. No.: 768,075

[22] Filed: Dec. 16, 1996

[51] Int. Cl.⁶ .................. B60C 27/04; B60C 27/14
[52] U.S. Cl. ................ 152/216; 152/218; 152/225 R
[58] Field of Search .................. 152/216, 217, 152/218, 225 R

[56] References Cited

U.S. PATENT DOCUMENTS

| | | | |
|---|---|---|---|
| 2,343,131 | 2/1944 | Austin | 152/225 R X |
| 2,423,759 | 7/1947 | Edwards | 152/225 |
| 2,598,298 | 5/1952 | Pindjak | 152/225 |
| 2,640,522 | 6/1953 | Schroen | 52/228 |
| 2,910,105 | 10/1959 | Binegar | 152/225 |
| 2,981,303 | 4/1961 | Hayes | 152/228 |
| 3,019,830 | 2/1962 | Shelby | 152/225 R |
| 3,053,302 | 9/1962 | Bopst, III | 152/226 |
| 3,249,143 | 5/1966 | Scott | 152/226 |
| 3,736,970 | 6/1973 | Clark | 152/226 |
| 3,847,196 | 11/1974 | Gomez | 152/226 |
| 3,891,018 | 6/1975 | Hyggen | 152/225 |
| 4,098,314 | 7/1978 | Welsh | 152/216 |
| 4,122,880 | 10/1978 | Hyggen | 152/216 |
| 4,209,049 | 6/1980 | Regensburger | 152/216 |
| 4,862,936 | 9/1989 | McDonough | 152/216 |
| 4,886,100 | 12/1989 | Parker, III | 152/216 |
| 4,974,653 | 12/1990 | Zelent | 152/216 |
| 5,154,187 | 10/1992 | Metraux | 152/216 |
| 5,513,684 | 5/1996 | Laub | 152/216 |

Primary Examiner—Francis J. Lorin

[57] ABSTRACT

The present disclosure concerns an emergency traction device which may be easily and securely fitted on vehicles having tires of different diameters and widths. A first winch sizes and secures the traction device for the proper tire diameter and a second winch sizes and secures the traction device for the proper tire width.

11 Claims, 5 Drawing Sheets

TRACTION DEVICE FOR A WHEELED VEHICLE

BACKGROUND OF THE INVENTION

1. Field of the Invention

The invention concerns a traction device for vehicles having at least one ground engaging tire. In particular, the invention is directed to an emergency traction device which is readily fitted to tires of various diameters and widths.

2. Description of Related Art

Known traction devices include snow tires, studded tires, and tire chains. The use of snow or studded tires require that the vehicle operator anticipate the occurrence of inclement weather and replace the ordinary tires with the snow or studded tires. Consequently, two sets of tires are required which must either be alternately mounted on one set of vehicle wheels, or a second set of wheels must be obtained. Disadvantages of snow or studded tires include the cost of changing multiple set of wheels and/or tires, and the inability to react to unexpected weather.

Tire chains are commonly installed on the ordinary tires of a vehicle to enable an operator to react to, rather than anticipate, inclement whether. The disadvantages of tire chains include the need to have a set of chains sized to fit the particular tires of a vehicle, and the possibility of a chain being "thrown-off" a rotating wheel damaging the vehicle body. Further, tire chains are generally installed by driving a tire onto the chain and subsequently linking the chain around the circumference of the tire. In the event the vehicle is already stuck, i.e. the tire spins without gaining traction, it is not possible to install the chains which could free the vehicle without elevating the tire off the ground.

Other types of device intended to be attached to the tires and/or wheels of vehicles for the purpose of improving traction are described in the U.S. Pat. Nos. to Laub (5,513,684); Metraux (5,254,187); Zelent (4,974,653); Parker, III (4,886,100); McDonough (4,862,936); Regensburger (4,209,049); Hyggen (4,122,880 and 3,891,018); Welsh (4,098,314); Gomez (3,847,196); Clark (3,736,970); Scott (3,249,143); Bopst III (3,053,302); Hayes (2,981,303); Binegar (2,910,105); Schroen (2,640,522); Pindjak (2,598,298) and Edwards (2,423,759). In general, these patents disclose traction devices having a plurality of arms extending outward toward the tread surface of the tire.

SUMMARY OF THE INVENTION

An objective of the present invention is to provide an emergency traction device for attachment to a vehicle tire which is conveniently stored, easily adapted to tires of different diameters and widths, as well as evenly and securely installed.

Another objective of the present invention is to provide an emergency traction device which may be readily installed and removed under any circumstances and terrain conditions.

A further objective of the present invention is to provide an emergency traction device which is immediately transferable between alternate vehicles having different size tires.

Yet another objective of the present invention is to provide an emergency traction device in which the mechanisms for fitting the device to the diameter and width of the wheel each operate concurrently.

DESCRIPTION OF THE PREFERRED EMBODIMENT

Figure 1:
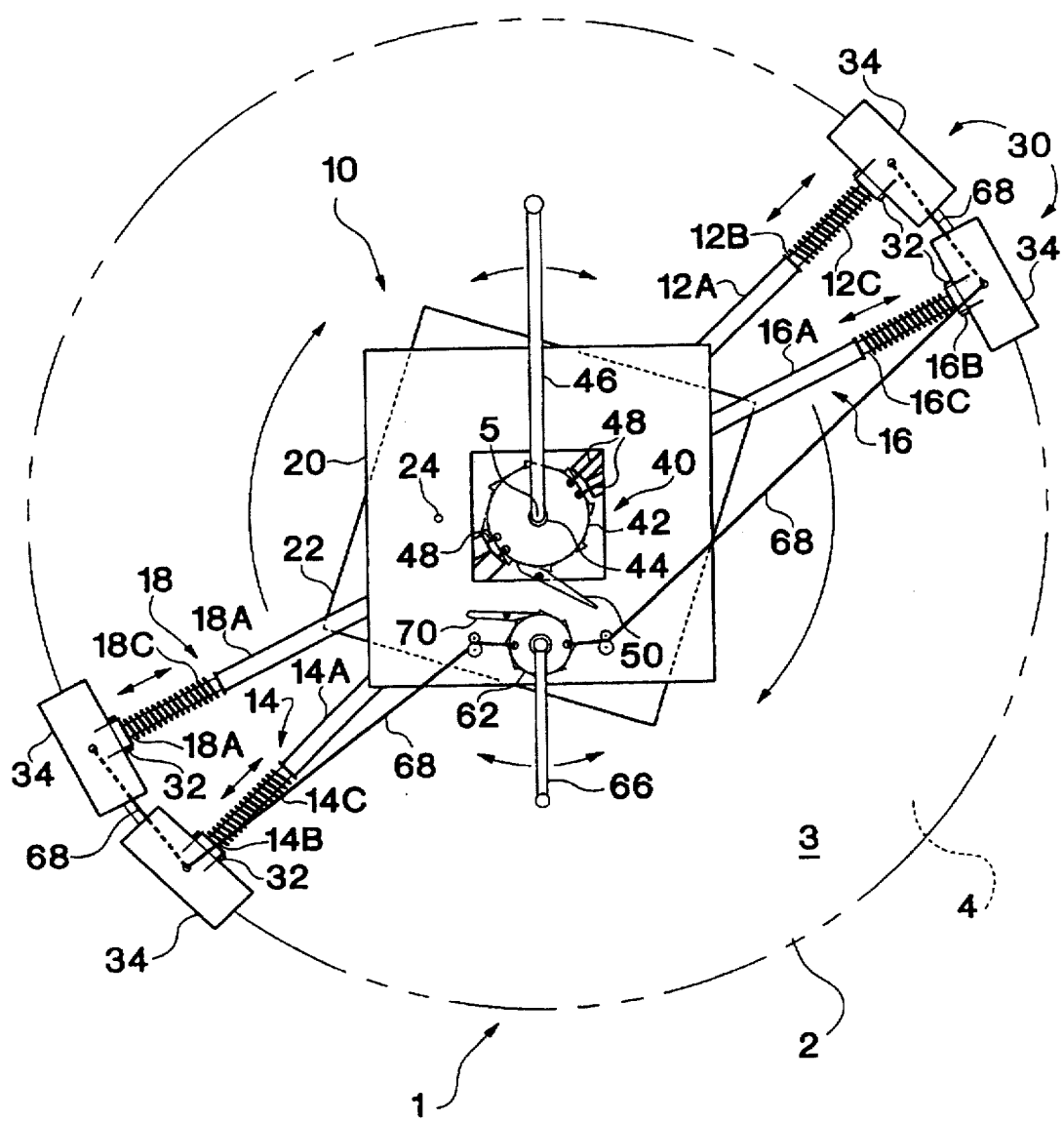
FIG. 1 is a front view of a traction device according to a first embodiment of the present invention shown in a collapsed state.
Figure 2:
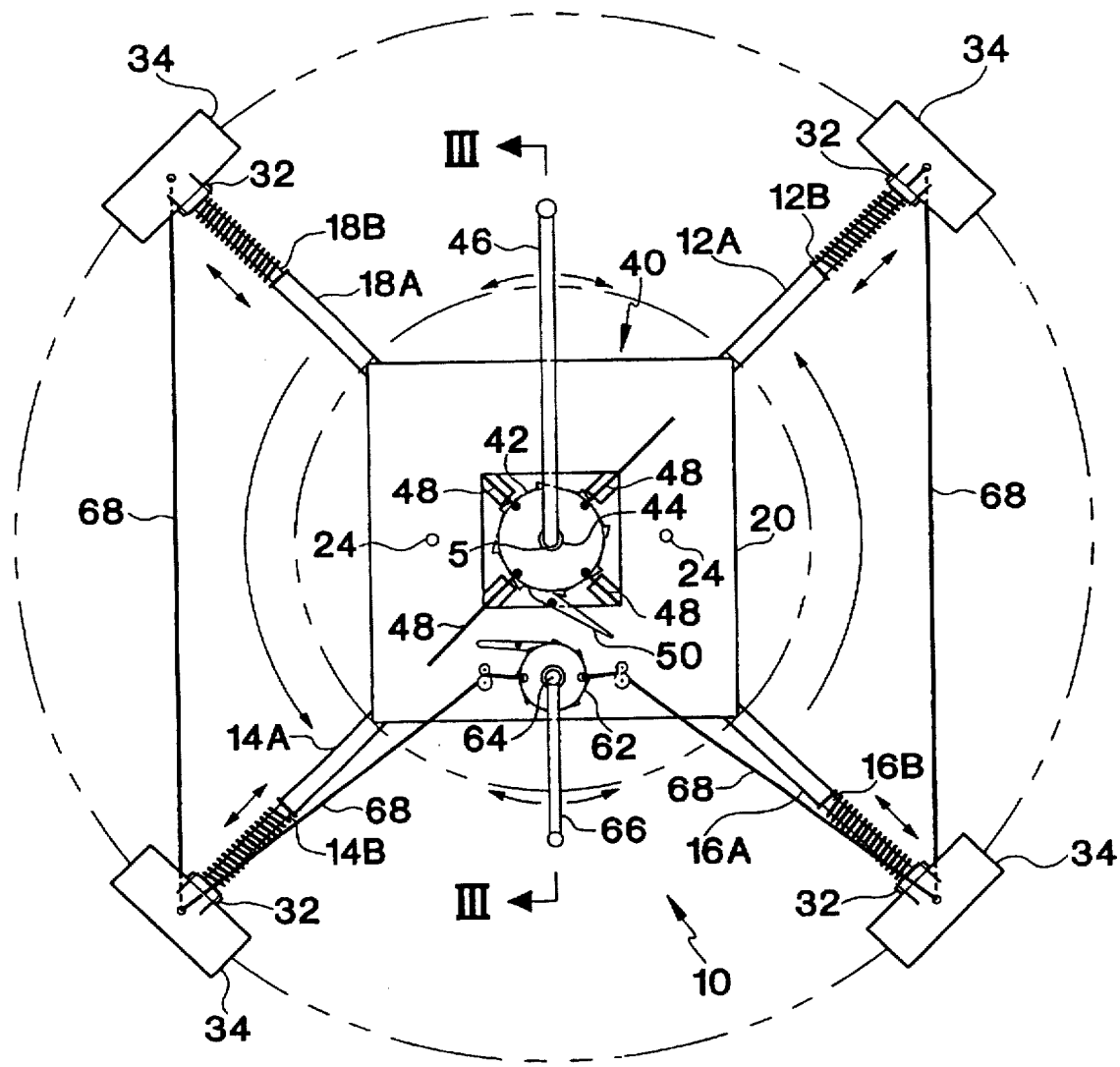
FIG. 2 is a front view of a traction device according to the first embodiment of the present invention shown in an installed state.
Figure 3:
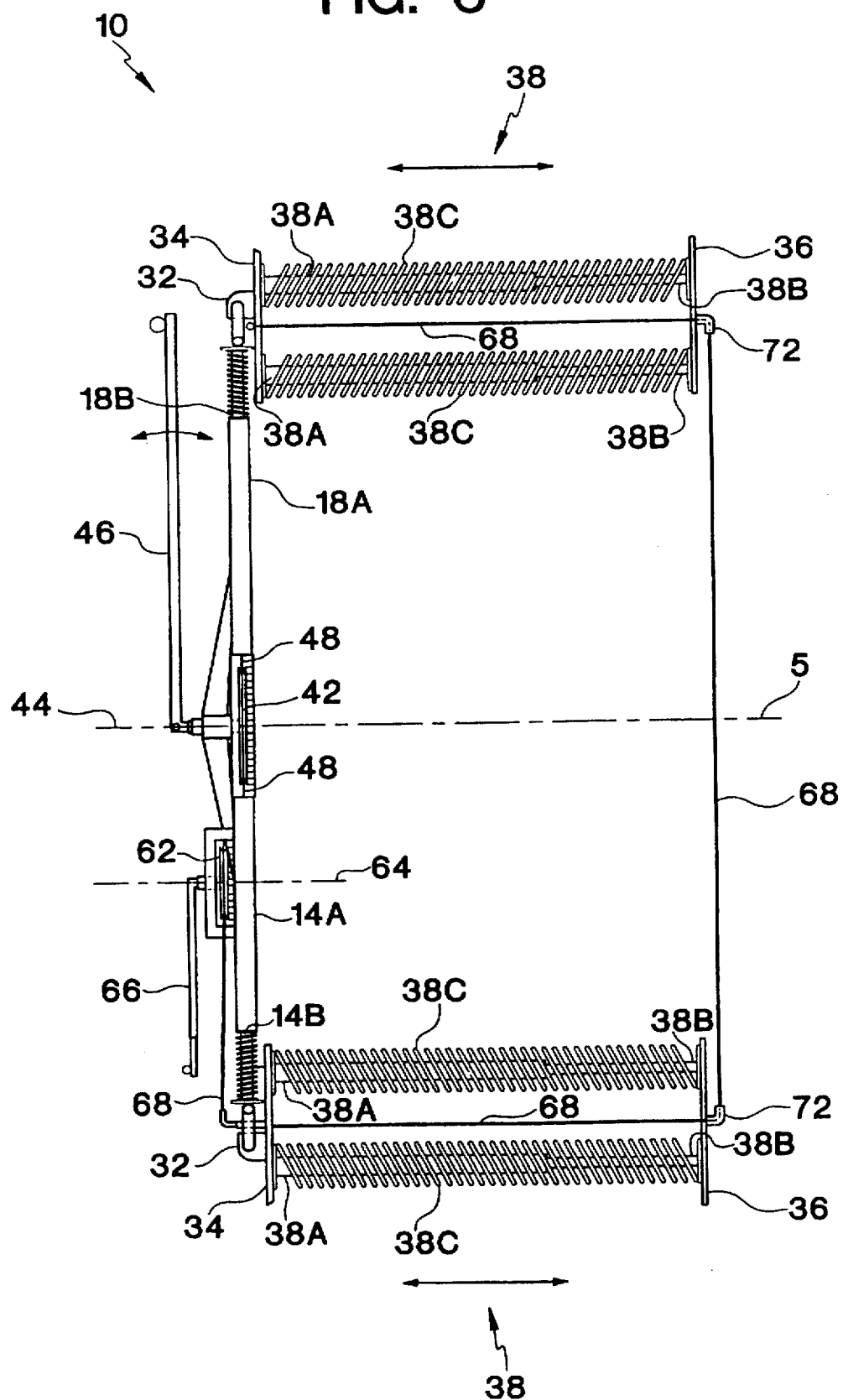
FIG. 3 is a cross-section view taken along line III—III in FIG. 2 of a traction device according to the first embodiment of the present invention.

Referring to FIGS. 1–3, a traction device 10 is shown with respect to a tire 1. Tire 1 includes a terrain engaging tread surface 2 and two sidewalls 3,4 connected by the tread 2 in a known arrangement.

Traction device 10 includes a plurality of arms 12,14,16,18 extending radially outward toward the tread 2. Although four arms are illustrated, it is understood the present invention may include more or less than four arms. However, at least two arms must be present, and at least three arms or an even multiple of arms are preferable.

Each arm includes at least two telescopically related sections such that each arm is extensible to accommodate tires of varying diameters. Although two telescopic sections A,B for each arm are illustrated for the purposes of describing the present invention, more than two telescopic sections are also possible. Preferably, telescopic sections A,B have cross-sections which prevent relative rotation along the length of the arms 12,14,16,18.

Each arm 12,14,16,18 further includes a resilient biasing element C, e.g. a coil spring, causing relative expansion of the telescopic sections A,B.

A first group of the arms 12,14 are fixed at their radially proximal end to a first support plate 20, and a second group of the arms 16,18 are fixed at their radially proximal end to a second support plate 22. First and second support plates 20,22 are relatively pivotal about a central point substantially coincident with the axis of rotation 5 for the tire 1. In the collapsed position of the traction device 10 (FIG. 1), first and second support plates 20,22 are relatively pivoted such that arms 12 and 16, as well as 14 and 18, are, clustered together. After positioning the traction device 10 with respect to tire 1, the first and second support plates 20,22 are relatively pivoted to equiangularly dispose the arms 12,14, 16,18 around the tire rotation axis 5 (FIG. 2). A lock mechanism 24 maintains the relative position of the first and second support plates 20,22.

A clamp mechanism 30 is supported at the radially distal end of each arm 12,14,16,18 by a hinge joint 32. The hinge Joints 32 enable the traction device 10 to be further collapsed for storage. Each clamp mechanism 30 includes a pair of plates 34,36 respectively engaging the opposite sidewalls 3,4 of tire 1. A spacer 38 is interposed between each pair of plates 34,36. Each spacer 38 includes telescopically related sections such that each clamp mechanism 30 is extensible to accommodate tires of varying widths. Although two telescopic sections 38A,38B for each spacer 38 are illustrated for the purposes of describing the present invention, more than two telescopic sections are also possible.

Each spacer 38 further includes a resilient biasing element 38C, e.g. a coil spring, causing relative expansion between the pairs of plates 34,36. Resilient biasing elements 38C also enhance the relative traction between both the tire 1 and spacer 38, as well as spacer 38 and the terrain. Further, biasing elements 38C are readily replaceable after significant wear.

Each spacer 38 is illustrated in FIG. 3 as including two pairs of telescopic sections 38A,38B with an exterior biasing element 38C. However, more or less than two pairs of telescopic sections may be interposed between the pairs of plates 34,36, and the biasing element 38C may be located inside the telescopic sections. In the latter case, chain links or other traction enhancing projections may be provided on the exterior of the telescopic sections.

A first winch 40 is supported by the first and/or second support plate 20,22 and includes a first winch drum 42 operably turned on a first drum axis 44 by a crank 46. As illustrated in FIG. 1 and 2, first drum axis 44 is coaxial with tire rotation axis 5 in order to improve inertial balance of the traction device 10 as it rotates with tire 1. Further, crank 46 may be removable to minimize the mass of the traction device 10.

The first end of each of a plurality of flexible elements 48, e.g. cables, are attached to first winch drum 42 and extend outward within the telescopic sections A,B of arms 12,14, 16,18. The second end of each of the plurality of flexible elements 48 is secured to a respective outboard section 12B,14B,16B,18B. Rotation of crank 46 causes flexible elements 48 to be wound on first winch drum 42, thereby contracting arms 12,14,16,18 against the force of biasing elements 12C,14C,16C,18C. A pivotal release latch 50 restricts reverse rotation of the first winch drum 42.

A second winch 60 is also supported by the first and/or second support plate 20,22 and includes a second winch drum 62 operably turned on a second drum axis 64 by a crank 66. Crank 66 may also be removable to reduce rotating mass of the traction device 10.

The first end of each of a plurality of flexible elements 68, e.g. cables, are attached to second winch drum 65 and extend outward to operate the clamp mechanisms 30. The second end of each of the plurality of flexible elements 68 is secured to one of the pairs of plates 34,36. As illustrated in FIGS. 2 and 3, one of the flexible elements 68 extends from second winch drum 62 outward along arm 14, respectively passes through plates 34 and 36 associated with arm 14, through plate 36 associated with arm 18, and finally attaches to plate 34 associated with arm 18. Rotation of crank 66 causes flexible elements 68 to be wound on second winch drum 62, thereby contracting clamp mechanisms 30 against the force of biasing elements 38C. A pivotal release latch 70 restricts reverse rotation of the second winch drum 62. In order to smoothly contract flexible elements 68, tubular passages 72, the exterior surface of hinges 32 and/or an antifriction roller may act as guides.

Figure 4:
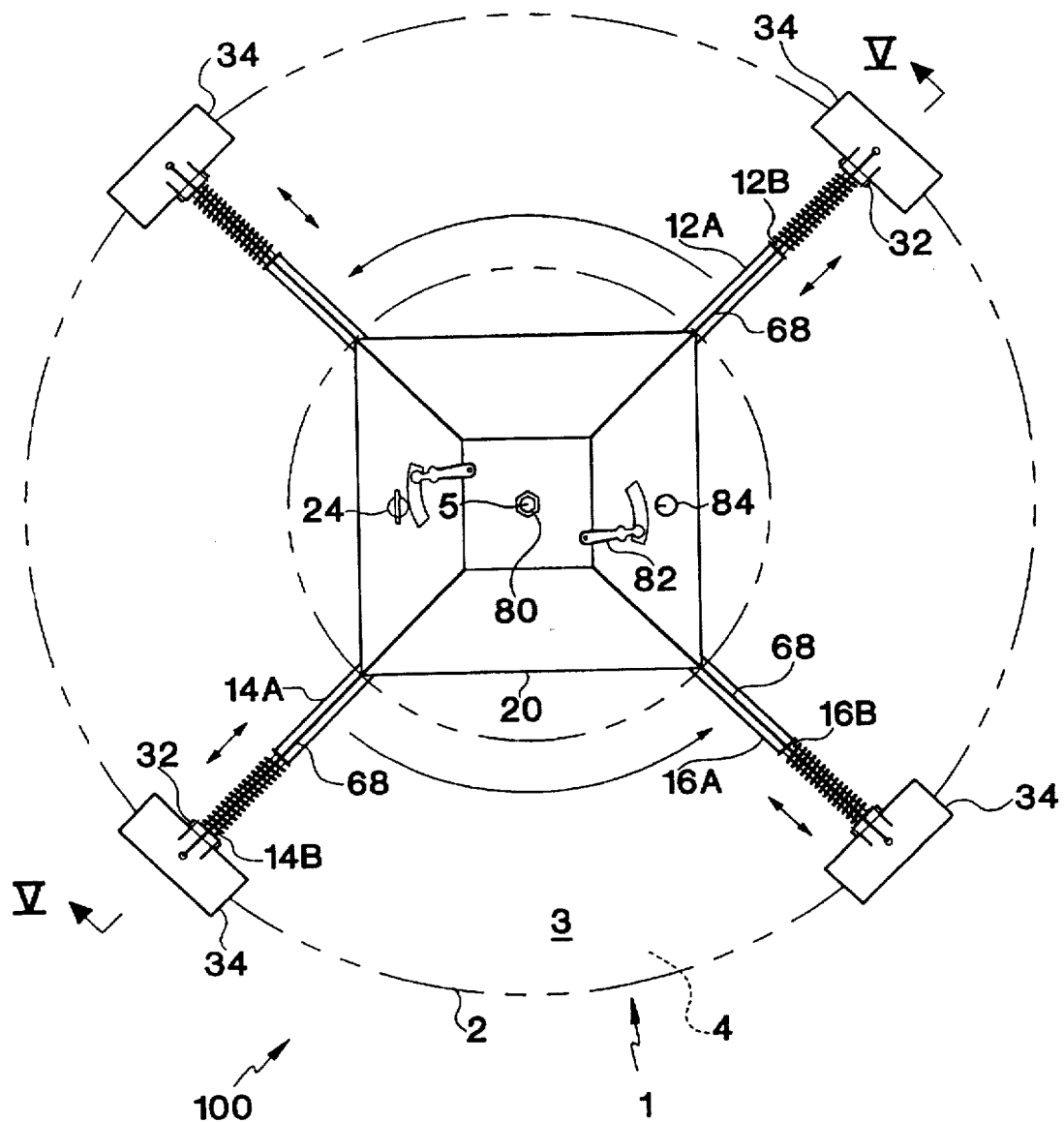
FIG. 4 is a front view of a traction device according to a second embodiment of the present invention shown in an installed state.
Figure 5:
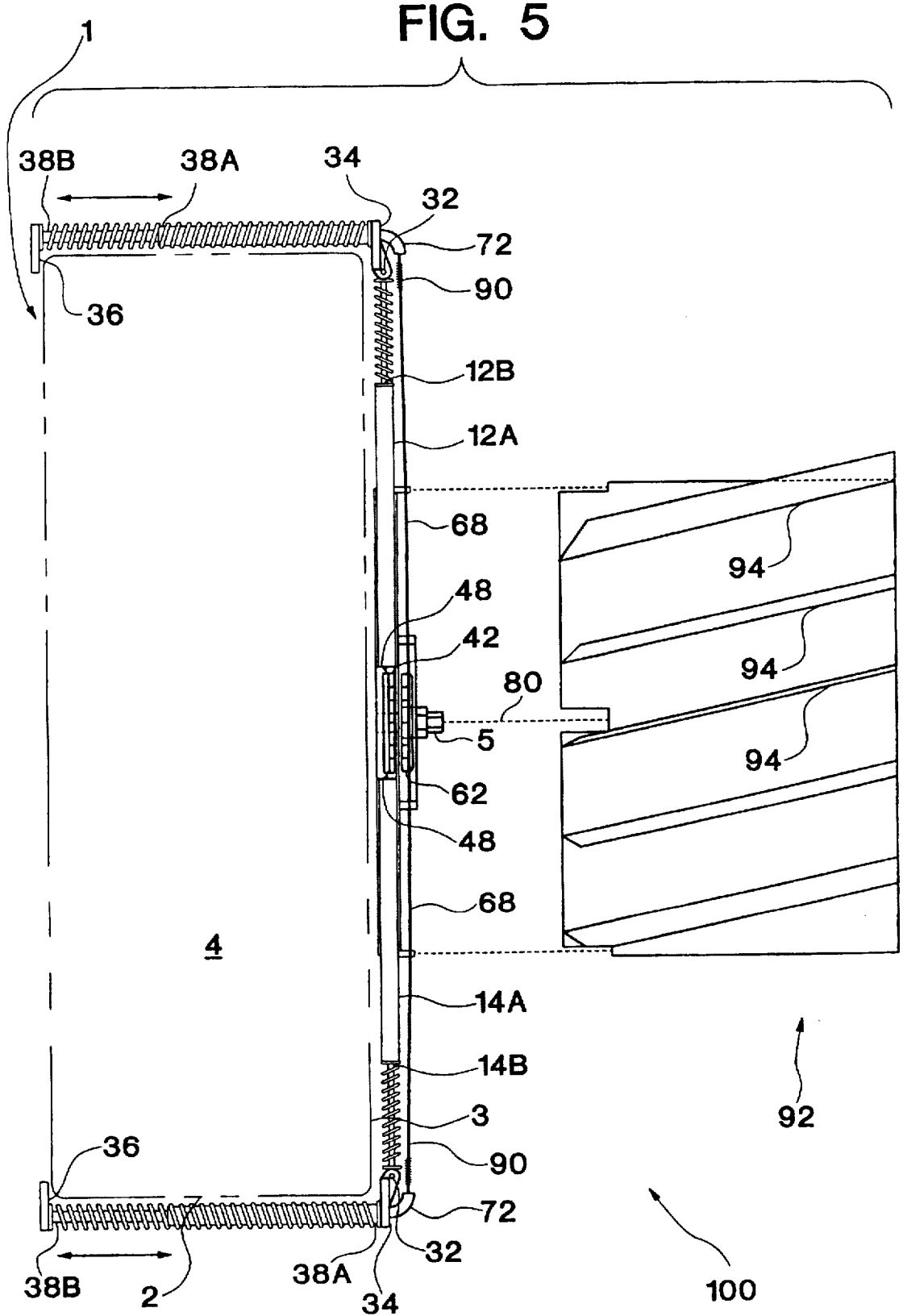
FIG. 5 is a cross-section view taken along line V—V in FIG. 4 of a modified version of the traction device according to the second embodiment of the present invention.

A traction device 100 according to a second embodiment of the present invention is shown in FIGS. 4 and 5. Significantly, a common axis of rotation 80 for both the first winch drum 42 and the second winch drum 62 is coaxial with the axis of rotation 5 for the tire 1. This minimizes any imbalance the traction device 100 creates while rotating with the tire 1.

A common pivotal release latch 82 restricts reverse rotation of the first and second winch drums, and a key lock 84 secures the release latch 82 to prevent unauthorized release of traction device 100 from the tire 1.

Additional modifications illustrated in FIG. 5 include resilient elements 90 interposed along the length of flexible elements 68, and a floatation cylinder 92 extending axially from at least one of the support plates 20,22. Resilient elements 90 compensate for deflection of the sidewalls 3,4 as portions of the tire 1 bulge due to contact of the tread 2 with the terrain. Floatation cylinder 92 and the associated outward projections 94 therefrom provide support and additional traction for a vehicle mired in infirm terrain such as mud and sand.

Further modifications envisioned within the scope of the appended claims include the addition of cable stops to limit movement of the flexible elements 68 thereby facilitating replacement of the biasing elements 38C, dual head crank configurations so that only a single crank is required to operate both winch drums, offsetting the crank axes with respect to the winch drum axes and using reduction gearing to provide a mechanical advantage while turning the winches, configuring flotation cylinder 92 with or as a winch drum surface to provide a further means to extricate a stuck vehicle, including mar resistant material on the backside of the support plates 20,22 to prevent scuffing a wheel, and providing friction enhancing material at the interface between the plates 34,36 and sidewalls 3,4.

What is claimed is:

1. A traction device for attachment with respect to a tire rotating on an axis, the tire having a terrain engaging surface and a pair of sidewalls connected by the terrain engaging surface, said traction device comprising:

a plurality of arms extending radially outward toward the terrain engaging surface, said arms are extensible;

clamping means for engaging the pair of sidewalls, said clamping means are supported at a radially distal end of each of said plurality of arms, said clamping means include a longitudinally extensible spacer overlying the terrain engaging surface;

a first winch radially contracting each of said plurality of arms; and, a second winch for longitudinally contracting said clamping means.

2. The traction device according to claim 1, further comprising:

first biasing means for radially expanding each of said plurality of arms; and, second biasing means for longitudinally expanding said clamping means.

3. The traction device according to claim 1, wherein said first winch includes a first drum rotatable on a first axis, and a plurality of first flexible elements wound on said first drum and connected to said plurality of arms; and, said second winch includes a second drum rotatable on a second axis, and a plurality of second flexible elements wound on said second drum and connected to said clamping means.

4. The traction device according to claim 3, wherein said first axis and said second axis are coaxial with the axis.

5. The traction device according to claim 3, wherein at least one of said first axis and said second axis are displaced from the axis.

6. The traction device according to claim 1, further comprising:

a hinge joint at said radially distal end of each of said plurality of arms, said hinge joint pivotally connects said clamping means to each of said plurality of arms.

7. The traction device according to claim 1, further comprising:

a first support plate fixed to at least a first and a second one of said plurality of arms;

a second support plate fixed to at least a third one of said plurality of arms, said first support plate and said second support plate are pivotal with respect to one another on the axis; and, a lock for securing said first support plate with respect to said second support plate, in a pivotal position wherein said plurality of arms are equiangularly disposed around the axis.

8. The traction device according to claim 7, further comprising:

a floatation cylinder extending concentrically along the axis and secured with respect to at least one of said first support plate and said second support plate, said floatation cylinder includes at least one flange extending radially outward from said floatation cylinder.

9. The traction device according to claim 1, wherein each said spacer includes a relatively telescopic first rod and first tube.

10. The traction device according to claim 1, wherein each of said plurality of arms includes a relatively telescopic second rod and second tube.

11. The traction device according to claim 10, wherein said second rod and said second tube have cross-sections that prevent relative rotation.

* * * * *